May 13, 1958 C. TORCHIO ET AL 2,834,418
CONVERSION OF A TWO WHEEL DRIVE TRACTOR
TO A FOUR WHEEL DRIVE TRACTOR
Filed Dec. 13, 1954 3 Sheets-Sheet 1
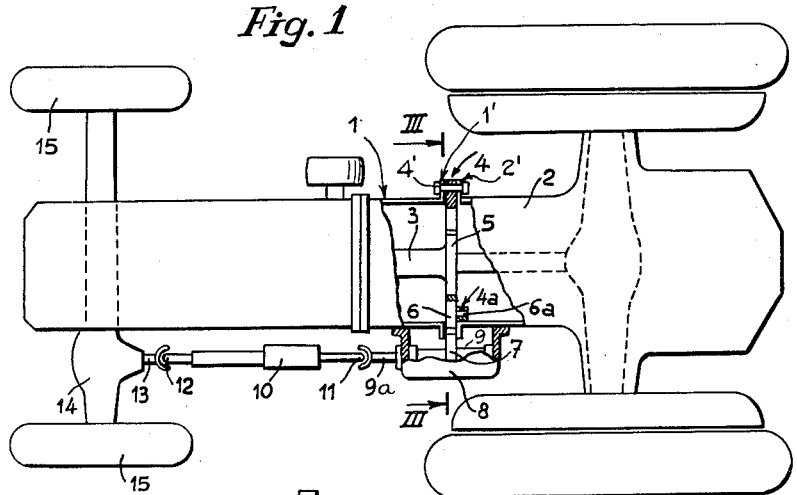
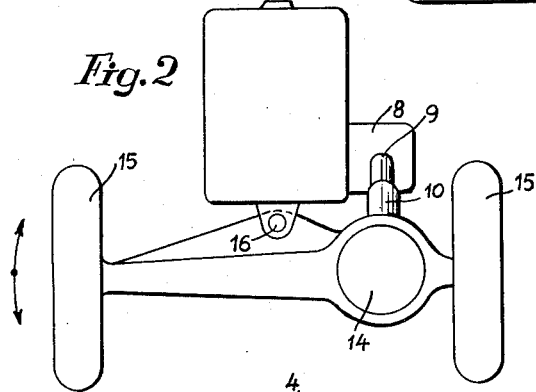
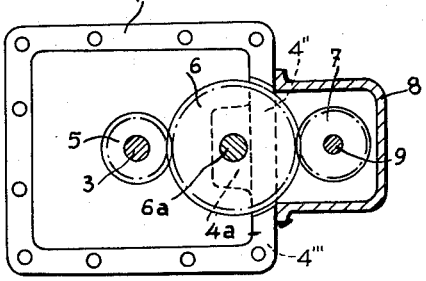
INVENTOR
SION SEGRE AMAR
CARLO TORCHIO
BY *Toulmin & Toulmin*
ATTORNEYS

INVENTOR
CARLO TORCHIO
SION SEGRE AMAR

BY *Toulmin & Toulmin*

ATTORNEY

May 13, 1958 C. TORCHIO ET AL 2,834,418
CONVERSION OF A TWO WHEEL DRIVE TRACTOR
TO A FOUR WHEEL DRIVE TRACTOR
Filed Dec. 13, 1954 3 Sheets-Sheet 3
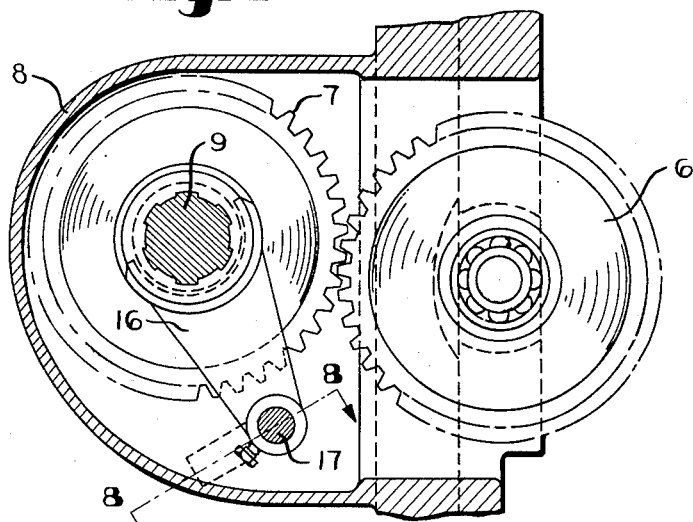
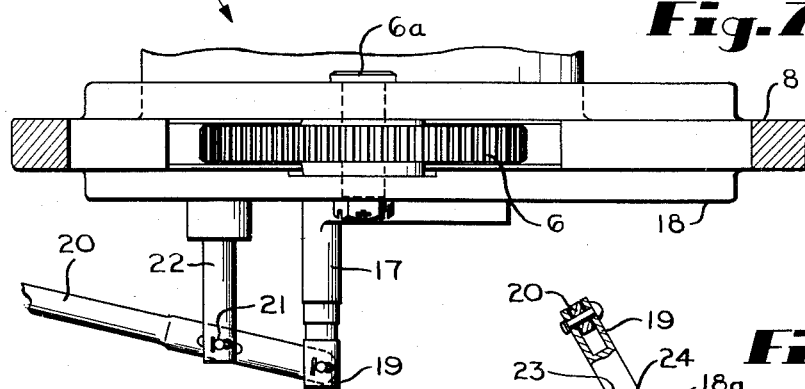
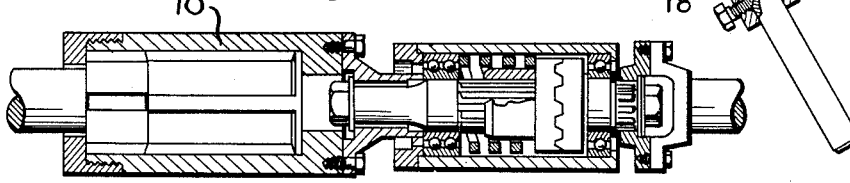
INVENTOR
CARLO TORCHIO
SION SEGRE AMAR
BY Toulmin & Toulmin
ATTORNEY

United States Patent Office 2,834,418
Patented May 13, 1958

2,834,418

CONVERSION OF A TWO WHEEL DRIVE TRACTOR TO A FOUR WHEEL DRIVE TRACTOR

Carlo Torchio, Belgioioso, and Sion Segre Amar, Nichelino (Turin), Italy; said Torchio assignor to Selene S. r. l., Nichelino (Turin), Italy Application December 13, 1954, Serial No. 474,907

Claims priority, application Italy December 12, 1953

1 Claim. (Cl. 180—49)

This invention relates to a method of converting rear drive tractors of the type having a box-shaped body including a rear portion supporting the rear wheels and enclosing the differential gear and a power transmission shaft for the rear wheels, and a fore portion detachably connected thereto and enclosing by its end adjacent said end body portion the change speed gear of the tractor, the output shaft of which projects towards said rear portion for connection with said power transmission shaft for the rear wheels, and in which said rear and fore portions of the body have complementary abutment flanges arranged each in a transverse plane of the body.

The method consists in deriving the power required for driving the front axle unit from the output shaft of the change speed gear through a device which is coupled at the option of the driver and supplies the necessary transmission ratio for equalising the peripheral speeds of the front and rear wheel set.

The device chiefly comprises a transmission of the gear, roller chain or other type, issuing from the output shaft of the gear box, of which the end member drives through a longitudinal shaft the front-axle differential.

The transmission of one of the above types can be supported, depending upon the kind of tractor in connection with which the invention is used, either by a frame adapted to be interposed between the front portion including the change speed gear and the rear portion of the tractor body enclosing a differential gear box, while confining at the same time the space required for the output from the transmission.

Motion is derived from the output shaft of the change speed gear through a toothed wheel or pinion mounted thereon in any existing groove or through auxiliary keying or splining means. Alternatively, depending upon the gear box type, motion can be derived from one of the constantly meshing gears on the countershaft of the gear box.

The method shall now be described in detail with reference to the accompanying drawing in which:

Figure 1 is a diagrammatical plan view of the converted four-wheel drive tractor.

Figure 2 is a front view and Figure 3 is a sectional view on line 3—3 of Figure 1.

Figure 4:
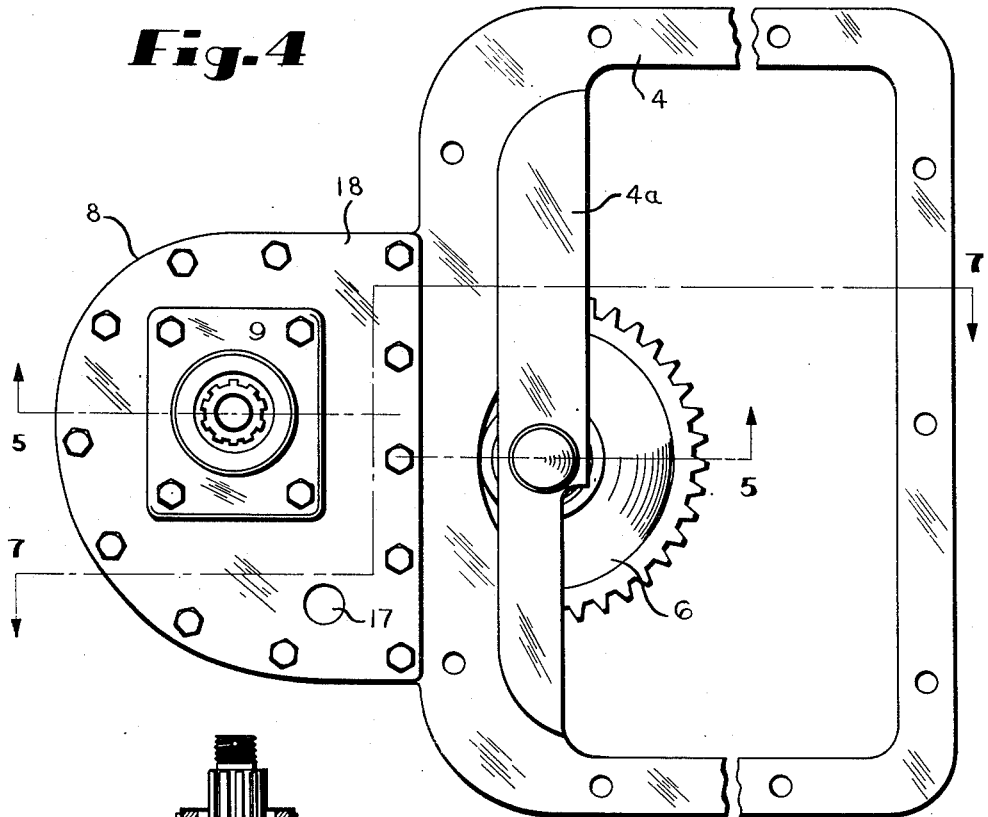
Figure 4 is a front view shown on enlarged scale of a structural detail of the converted four-wheel drive tractor, according to one modification.
Figure 5:
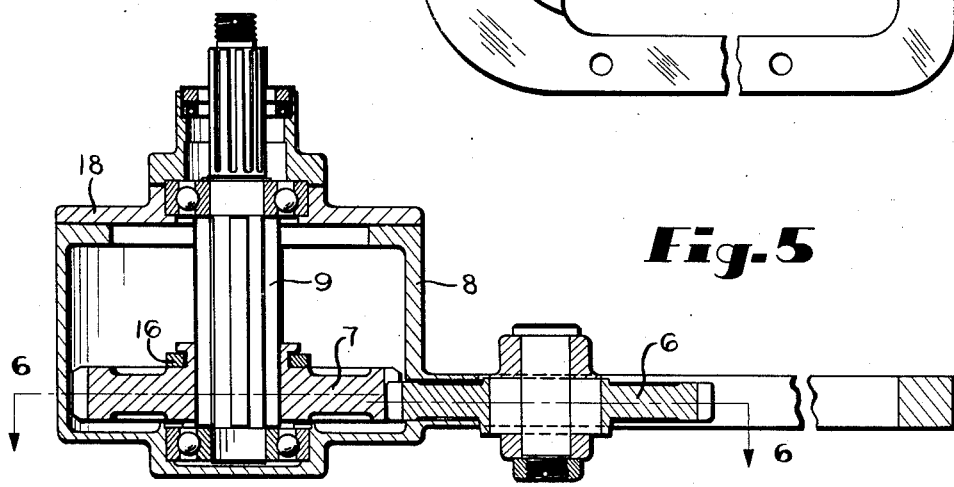

Figure 5 is a section taken on line 5—5 of Figure 4.
Figure 6 is a section taken on line 6—6 of Figure 5.
Figure 7 is a section taken on line 7—7 of Figure 4.
Figure 8 is a section taken on line 8—8 of Figure 6.
Figure 9 is a longitudinal section of a structural detail of the tractor shown in Figures 1 and 2, shown on enlarged scale.

Throughout the figures corresponding elements are denoted by the same reference numerals.

On the drawings, 1 denotes the rear part of the fore portion of the box shaped body of a tractor enclosing the change speed gear (not shown), of which the output shaft is denoted by 3. The rear portion of the tractor body is denoted by 2 and encloses the differential gear and power transmission shaft (shown diagrammatically by dotted lines in Figure 1) for the rear wheels of the tractor supported by the said body portion 2.

Between the adjacent ends of the fore and rear portions 1, 2 respectively of the tractor, a frame 4 is inserted and secured to the flanged end portions 1', 2', respectively, of the latter as by bolts 4'. The thickness of the frame 4 is such as to space the portions 1 and 2 of the tractor body, which are secured to each other, before converting the rear drive tractor to a four-wheel tractor, by connecting the flanges 1' and 2' by means of bolts or like releasable connecting means, in order to leave free a suitable space adapted to receive a transmission comprising, for instance, three toothed wheels 5, 6 and 7 of which wheel 5 is secured to the change speed gear output shaft 3, wheel 6 is rotatable on a shaft 6a carried by an inner extension 4a on the frame 4 and projecting through a slot 4" cut in the lateral wall 4''' of the frame 4 into a lateral box 8 supported by the frame 4 and arranged laterally of the side walls of the portions 1 and 2 of the tractor body. The wheel 7 is splined to the portion of the shaft 9, situated within the box 8, the shaft 9 being substantially parallel with the shaft 3 and rotatably supported in the box 8. The wheel 7 can be disengaged from the wheel 6, in order to clutch out the front wheel drive, when required.

The end portion 9a of the shaft 9 projecting outwardly from the box 8 and facing the front of the tractor is drivingly connected to a front power transmission shaft 10 which can be extended telescopically and is provided with universal joints 11, 12 at its ends to the input 13 of the differential gear 14 on the front wheels 15. The shaft 10 further encloses a clutch of known structure as shown in Figure 9, adapted to limit the torque that can be transmitted to the front axle 14 and at the same time act as a slip coupling for taking up instantaneous occasional differences in peripheral speed of the front and rear wheel sets.

The front axle 14 is articulated at its central portion 16 to the front portion of the box-shaped tractor body.

According to a preferred embodiment of my improved structure shown in Figures 4 to 8, the frame 4 is integral with the lateral box 8. The toothed wheel 7 splined on the shaft 9 has a groove cut in its hub, which is engaged by a forkshaped member 16 secured to a shaft 17 slidably mounted in the cover 18 of the box 8. The end 19 of said shaft 17 is hinged to a control lever 20 rocking about the axis 21 of a member 22 carried by the cover 18.

The shaft 17 has at its region near the cover 18 two grooves 23 and 24 cut therein, said grooves being in aligned spaced relationship and engaged by a ball 25 slidable in a bore 26 formed in an extension 18a on the cover 18 and urged towards the shaft 17 by a helical spring 27 held in position by a screw 28 closing the bore 26.

Spacing of the grooves 23 and 24 is chosen so as to define two positions of the shaft 17, in which the forked member 16 holds the toothed wheel 7 in or out of engagement, respectively, with the toothed wheel 6.

The clutches in Figures 5 and 9 and the clutch operating mechanisms in Figures 6 to 8 are old per se as demonstrated by referring to United States Patents Serial Nos. 2,185,636—Kysor and 2,162,334—Herrington and form no part of this invention.

What we claim is.

In a rear drive tractor, a box shaped body comprising rear and fore portions detachably secured together, said rear portion supporting the rear wheels and enclosing the differential gear and power transmission shaft for the rear wheels, said fore portion supporting a front wheel shaft and enclosing at its end adjacent said rear body portion a change speed gear with the output shaft thereof projecting toward said rear portion for connection with said power transmission shaft for the rear wheels, complementary flanges on said rear and fore portions each arranged in a transverse plane of said body and in registration when said body portions are secured together, a frame secured to and between said flanges with both sides thereof contacting the faces of both flanges so as to form a continuation of said body, there being an opening in said frame, a lateral box on said frame and communicating with the interior of said body through said frame opening, a rotatably mounted shaft in said lateral box, a transmission drive within said frame to transmit power to said shaft in said lateral box from the same change gear output shaft which is drivingly connected through said power transmission shaft to said rear wheels whereby said front and rear wheels can be driven at the same rotary speed, means for transmitting power from said lateral box shaft to said front wheel shaft, and clutch means for selectively engaging and disengaging said lateral box shaft from said transmission drive.

References Cited in the file of this patent

UNITED STATES PATENTS

| | | |
|---|---|---|
| 1,819,640 | Davies | Aug. 18, 1931 |
| 2,162,334 | Herrington | June 13, 1939 |
| 2,173,044 | Ruggles et al. | Sept. 12, 1939 |
| 2,185,636 | Kysor | Jan. 2, 1940 |
| 2,531,818 | Kranick | Nov. 28, 1950 |